United States Patent
Oda et al.

(10) Patent No.: US 7,565,894 B2
(45) Date of Patent: Jul. 28, 2009

(54) FUEL INJECTION APPARATUS FOR AND METHOD OF INTERNAL COMBUSTION ENGINE, AND FUEL INJECTION VALVE

(75) Inventors: Tomoaki Oda, Isesaki (JP); Hitoshi Furudate, Isesaki (JP); Junichi Furuya, Isesaki (JP); Yoshihiro Sukegawa, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/518,499

(22) Filed: Sep. 11, 2006

(65) Prior Publication Data

US 2007/0056555 A1   Mar. 15, 2007

(30) Foreign Application Priority Data

Sep. 12, 2005  (JP)  ............................. 2005-263167
Sep. 29, 2005  (JP)  ............................. 2005-285213
Jul. 21, 2006  (JP)  ............................. 2006-199281

(51) Int. Cl.
  *F02B 31/08*  (2006.01)
  *F02B 15/02*  (2006.01)
(52) U.S. Cl. ..................................... 123/308; 123/432
(58) Field of Classification Search ................. 123/429, 123/205, 207, 209, 298, 302, 305, 308, 467, 123/432; 701/103; 239/533.12
See application file for complete search history.

(56) References Cited

U.S. PATENT DOCUMENTS

| | | | | |
|---|---|---|---|---|
| 3,620,195 A | * | 11/1971 | Lamm et al. ................. | 123/207 |
| 3,937,186 A | * | 2/1976 | Stock et al. .................. | 123/242 |
| 4,770,139 A | * | 9/1988 | Tanaka ......................... | 123/308 |
| 5,138,989 A | * | 8/1992 | Fraidl et al. ............... | 123/193.5 |
| 5,501,194 A | * | 3/1996 | Kanehara et al. ............. | 123/470 |
| 5,645,029 A | * | 7/1997 | Ohsuga et al. ............... | 123/306 |
| 5,829,408 A | * | 11/1998 | Yamaguchi et al. .......... | 123/308 |
| 6,443,124 B2 | * | 9/2002 | Yamaguchi et al. .......... | 123/308 |
| 6,634,337 B2 | * | 10/2003 | Akagi et al. ................. | 123/470 |
| 6,854,448 B2 | * | 2/2005 | Okamoto et al. ............. | 123/470 |
| 6,880,518 B2 | * | 4/2005 | Shiraishi et al. ............. | 123/295 |
| 6,918,372 B2 | * | 7/2005 | Nishii et al. ................. | 123/306 |
| 7,100,560 B2 | * | 9/2006 | Yageta et al. .............. | 123/193.5 |
| 7,100,572 B2 | * | 9/2006 | Watanabe et al. ............ | 123/429 |
| 7,150,267 B2 | * | 12/2006 | Kuriki et al. ................. | 123/432 |
| 7,195,000 B2 | * | 3/2007 | Kayama et al. .............. | 123/432 |

(Continued)

FOREIGN PATENT DOCUMENTS

JP   11-141435   *   5/1999

(Continued)

*Primary Examiner*—Hai H Huynh
(74) *Attorney, Agent, or Firm*—Foley & Lardner LLP

(57) ABSTRACT

Fuel injection technology of an internal combustion engine is configured in such a manner that in a case where in inlet pipe interior of the engine is partitioned by a rectifying plate into upper and lower flow paths, a flow velocity at a center of the flow path on an upper side, and at a center of the flow path on a lower side is increased. Consequently, a flow velocity distribution of air in a cylinder diametrical direction of a valve head of an inlet valve becomes a peak value on both sides of the valve head center. Therefore, by impinging most of the injected fuel spray upon both sides of the center of the valve head, vaporization of the fuel spray can be performed with good efficiency.

18 Claims, 18 Drawing Sheets

U.S. PATENT DOCUMENTS

| | | | |
|---|---|---|---|
| 2002/0040692 A1* | 4/2002 | LaPointe et al. | 123/27 GE |
| 2003/0116021 A1* | 6/2003 | Oda et al. | 96/134 |
| 2003/0121495 A1* | 7/2003 | Abo et al. | 123/295 |
| 2003/0150431 A1* | 8/2003 | Oota | 123/506 |
| 2003/0217739 A1* | 11/2003 | Saeki et al. | 123/543 |
| 2004/0118379 A1* | 6/2004 | Harui | 123/432 |
| 2004/0164187 A1* | 8/2004 | Kihara et al. | 239/552 |
| 2005/0060086 A1* | 3/2005 | Abe et al. | 701/103 |
| 2005/0081822 A1* | 4/2005 | Yageta et al. | 123/308 |
| 2006/0089780 A1* | 4/2006 | Muto et al. | 701/103 |
| 2006/0096569 A1* | 5/2006 | Goenka et al. | 123/208 |

FOREIGN PATENT DOCUMENTS

| | | |
|---|---|---|
| JP | 2001-295738 A | 10/2001 |
| JP | 2004-225598 A | 8/2004 |
| JP | 2005-120994 A | 5/2005 |

* cited by examiner

US 7,565,894 B2

FUEL INJECTION APPARATUS FOR AND METHOD OF INTERNAL COMBUSTION ENGINE, AND FUEL INJECTION VALVE

BACKGROUND OF THE INVENTION

1. Field of the Invention

The present invention relates to a fuel injection apparatus for an internal combustion engine, which injects fuel from an upstream side of an inlet valve towards the inlet valve, and to a fuel injection method of an internal combustion engine, and a fuel injection valve.

2. Description of the Related Art

In Japanese Unexamined Patent Publication No. 2001-295738, there is disclosed a fuel injection apparatus for an internal combustion engine in which an extension pipe is provided on a tip end portion of a fuel injection valve, and fuel is injected towards the inlet valve via this extension pipe.

Furthermore, in Japanese Unexamined Patent Publication No. 2004-225598 there is disclosed a fuel injection valve where, in a engine furnished with two inlet valves in respective cylinders, a flow amount of fuel injected from a fuel injection valve is a maximum value at a position displaced from a central portion of a valve head of one inlet valve towards the other inlet valve.

According to this fuel injection valve, attachment of fuel to the combustion chamber wall is suppressed, and hence the discharge amount of hydrocarbons HC from the engine can be reduced.

Furthermore, in Japanese Unexamined Patent Publication No. 2005-120994, there is disclosed an internal combustion engine provided with a rectifying plate which partitions the internal path of the inlet pipe into upper and lower separate paths and also a butterfly valve which controls the inlet flow of air to the lower path of the inlet pipe extending below the rectifying plate.

When the butterfly valve is closed, air flows only in the flow path on the upper side of the inlet pipe, and as a result a strong tumble flow is produced inside the combustion chamber.

Incidentally, at the time of starting the engine, since the temperature of the inlet valve is low, the vaporization rate of the fuel attached to the valve head of the inlet valve is low, and the film thickness of the liquid fuel attached to the valve head of the inlet valve is thick. Therefore, at the time of starting, a large amount of fuel flows into the combustion chamber in the liquid state, so that the discharge amount of hydrocarbons HC from the engine becomes great.

Furthermore, in the above manner, in the case where a rectifying plate is provided in order to intensify the tumble flow, the air movement in the inlet pipe changes. However up to now, the fuel spray with respect to the change in the air movement has not been optimized.

SUMMARY OF THE INVENTION

An object of the present invention is to optimize the fuel spray with respect to a change in the air movement due to providing a rectifying plate, to thereby efficiently vaporize the fuel spray.

In order to achieve the above object, the present invention provides a novel fuel injection technology for an internal combustion engine provided with a rectifying plate which is arranged in an inlet pipe of the engine, so that fuel may be injected towards a region where the air movement is strengthened due to the arrangement of the rectifying plate.

In the case where the rectifying plate partitions the inlet pipe into upper and lower, a flow velocity at a center of a flow path on a upper side, and at a center of a flow path on a lower side is increased. Consequently, a flow velocity distribution of air in a cylinder diameter direction of a valve head of an inlet valve becomes a peak value on both sides of the valve head center. Therefore, by directly discharging most of the fuel onto both sides of the center of the valve head, vaporization of the fuel spray can be performed with good efficiency.

The other objects and features of this invention will become understood from the following description with reference to the accompanying drawing.

DETAILED DESCRIPTION OF THE INVENTION

First Embodiment

Figure 1:
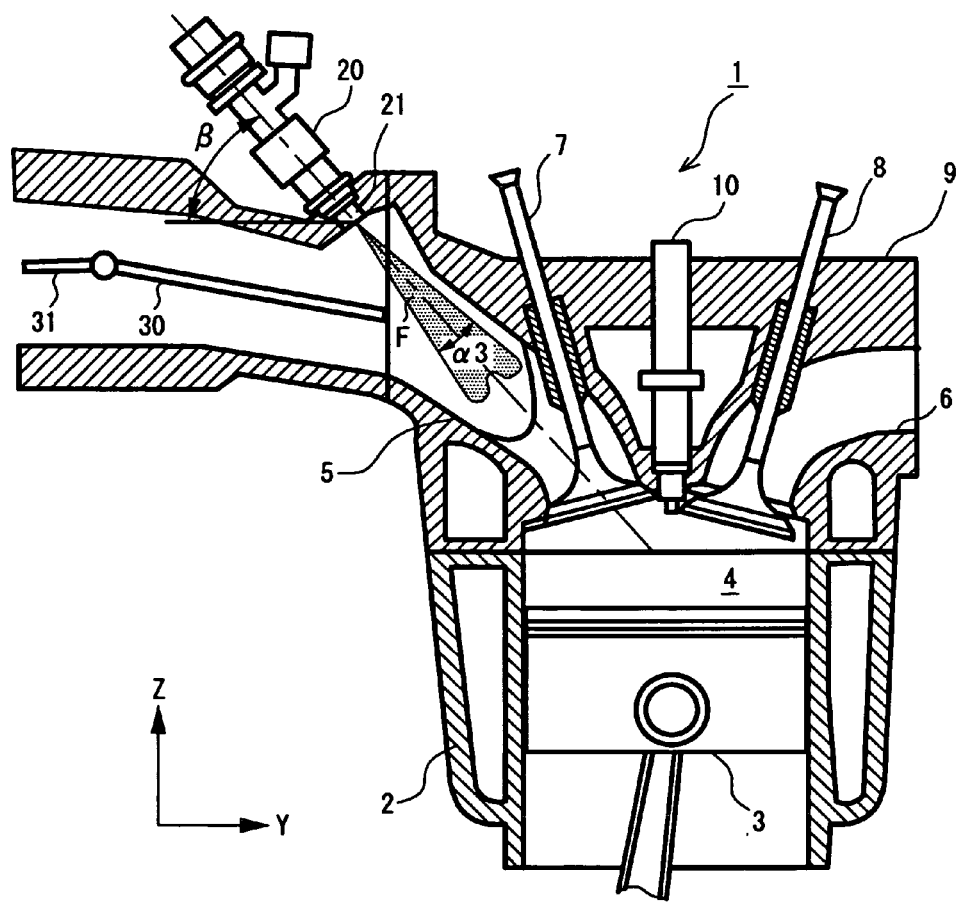
FIG. 1 is a longitudinal section view of an internal combustion engine according to a first embodiment of the present invention.
Figure 2:
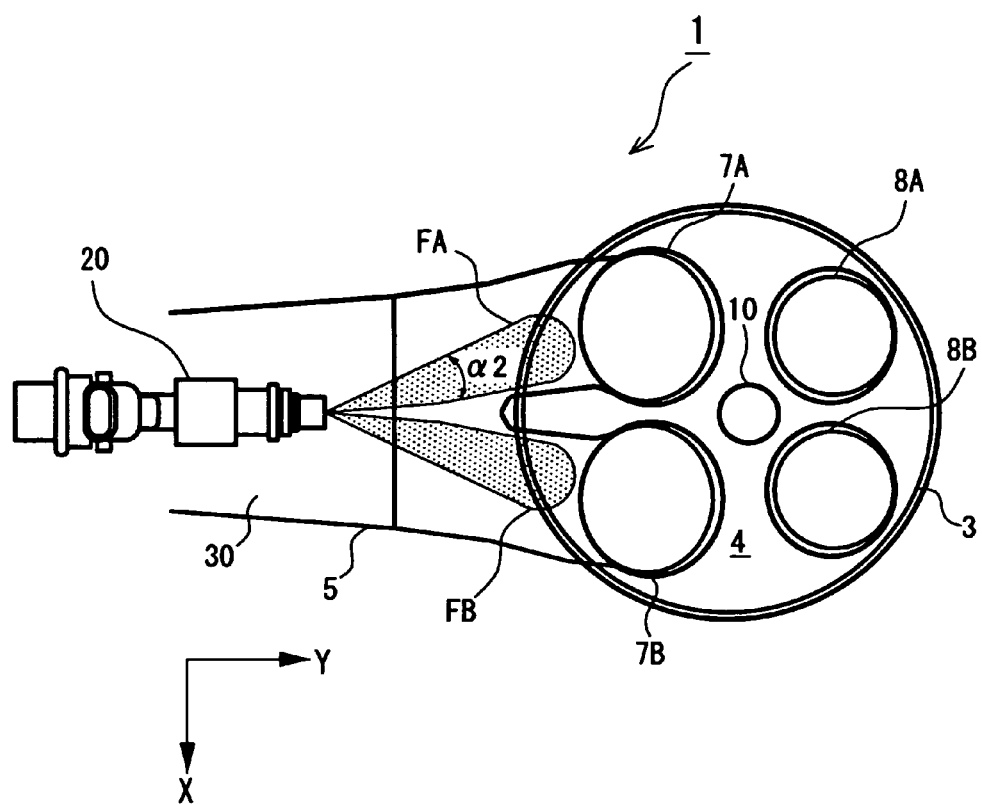
FIG. 2 is a plan view of the internal combustion according to the first embodiment of the present invention.

FIG. 1 shows a longitudinal section of an internal combustion engine, and FIG. 2 schematically shows a top cross-section of the internal combustion engine.

Engine 1 includes; a cylinder block 2, a cylinder head 9, and a piston 3 which is inserted into cylinder block 2, and a combustion chamber 4 is formed by cylinder head 9 and piston 3.

An inlet pipe 5 and an exhaust pipe 6 formed in cylinder head 9 open into combustion chamber 4, and two inlet valves 7A and 7B, and two exhaust valves 8A and 8B are arranged in cylinder head 9.

A fuel injection valve 20 is arranged on the upstream side of inlet pipe 5. Fuel injection valve 20 is arranged at a position where it can spray fuel towards the inlet valves 7A and 7B. A spark plug 10 is provided on the central upper portion of combustion chamber 4.

A rectifying plate 30 is provided inside inlet pipe 5, and a tumble control valve 31 is provided on the upstream side of rectifying plate 30.

Rectifying plate 30 functions as a partitioning element to divide the flow path inside inlet pipe 5 into upper and lower, and the tip end position thereof is set at a position as close as possible to inlet valves 7A and 7B in a region where the fuel spray injected from fuel injection valve 20 does not contact.

Tumble control valve 31 is a valve for controlling the air inflow to the flow path on the lower side of the rectifying plate 30, and is driven by a motor (not shown in the drawing figure).

A fuel spray F of fuel injection valve 20 proceeds in two separate directions, with one fuel spray FA aimed at inlet valve 7A, and the other fuel spray FB aimed at inlet valve 7B.

Regarding fuel sprays FA and FB, their respective spray angles are determined so that as much as possible they do not strike the inside wall of inlet pipe 5.

Figure 3:
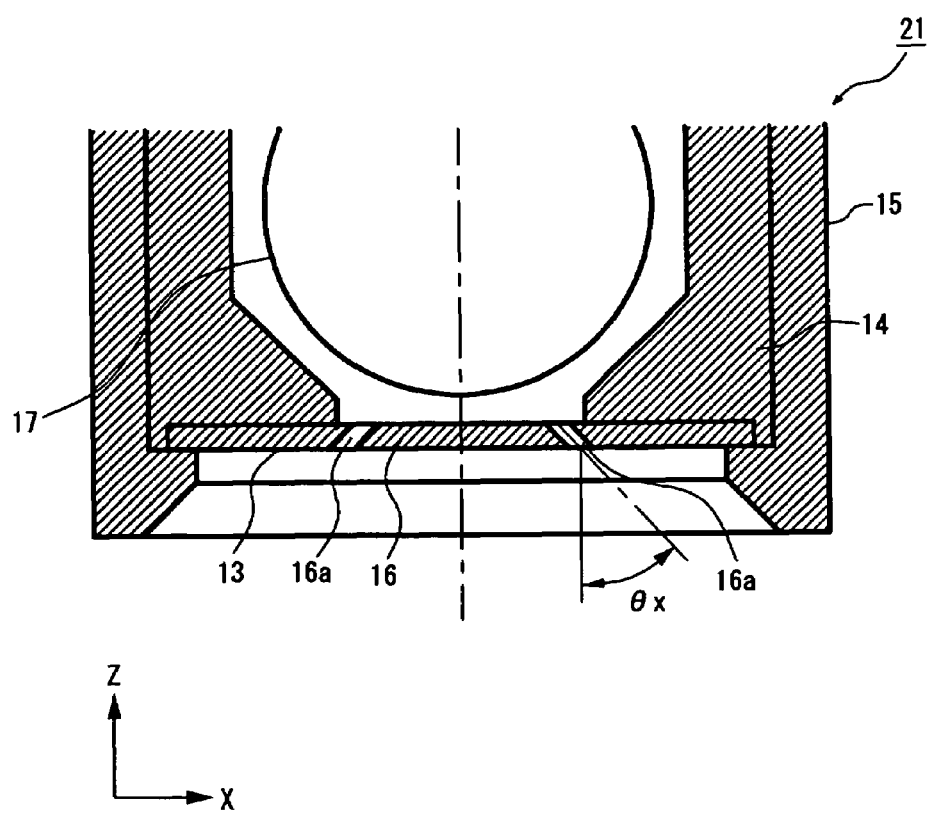
FIG. 3 is a sectional view of a tip end of a fuel injection valve, taken along the line A-A of FIG. 4, in the first embodiment of the present invention.
Figure 4:
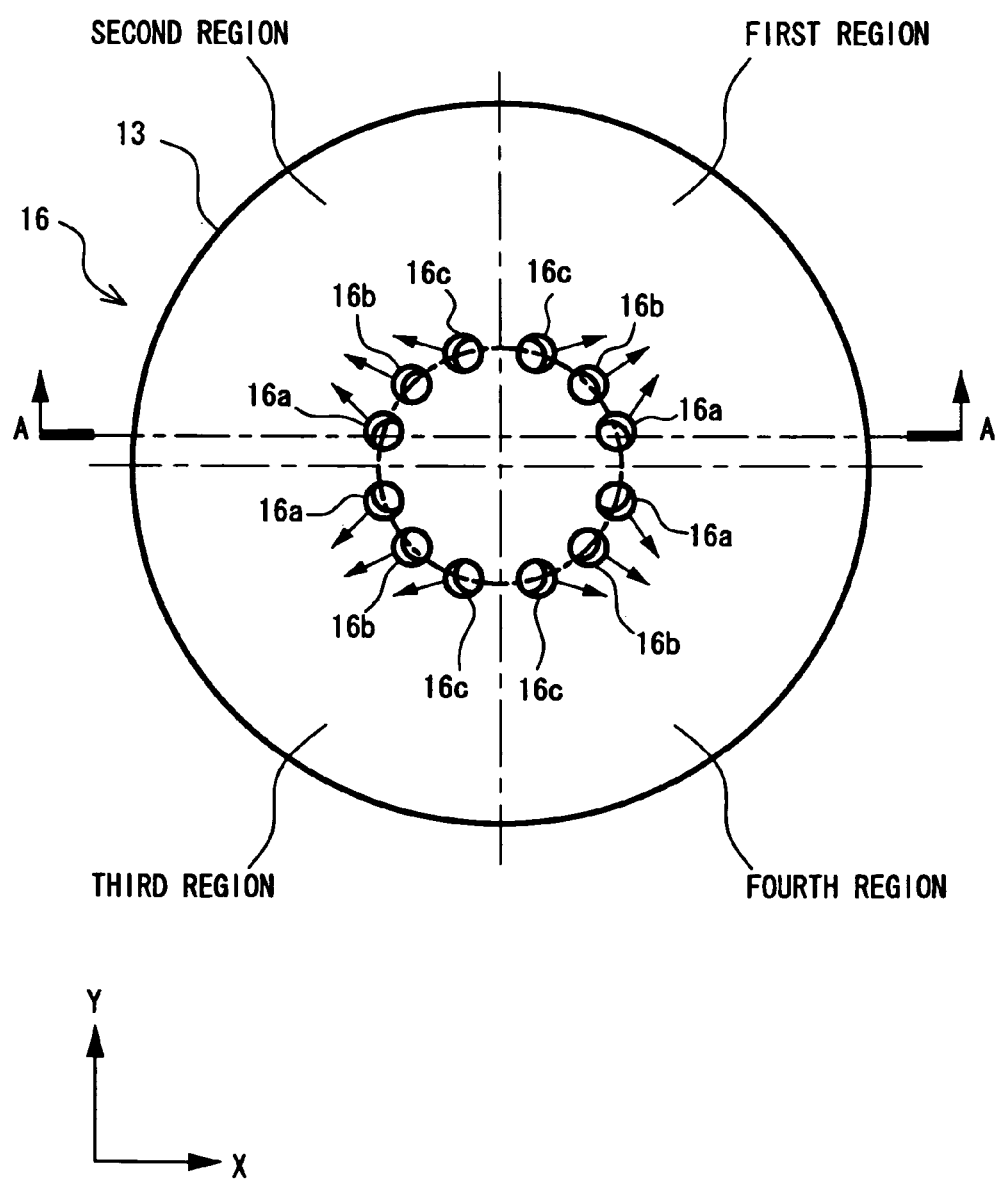
FIG. 4 is a planar view of a nozzle plate of the fuel injection valve in the first embodiment of the present invention, viewing from the outer side of the tip.

FIGS. 3 and 4 show a nozzle section 21 of fuel injection valve 20, and in particular, FIG. 3 shows the longitudinal section (section on A-A of FIG. 4) of nozzle section 21 of fuel injection valve 20, and FIG. 4 is a view of nozzle section 21 of fuel injection valve 20 seen from the tip end side.

In nozzle section 21 of fuel injection valve 20, a nozzle plate 13 is secured to a holder 15 by means of a guide 14.

In nozzle plate 13, a plurality of injection nozzles 16 are bored.

Inside holder 15 is provided a ball valve 17 capable of moving up and down, and by raising ball valve 17, a small gap between guide 14 and ball valve 17 allows fuel to flow, so that fuel is injected from injection nozzles 16.

Here, the side-by-side direction of the two inlet valves 7A and 7B is defined as the X-axis, the diameter direction of the cylinder is defined as the Y-axis, and the axial direction of the cylinder is defined as the Z-axis, and the center of the nozzle plate 13 is the origin point.

First through fourth regions provided around the center of nozzle plate 13 are defined as shown in FIG. 4.

Furthermore, an inclination angle of the central axis of injection nozzles 16 towards the X-axis direction is defined as θx, and an inclination angle towards the Y-axis direction is defined as θy.

Injection nozzles 16 are bored in threes in the respective regions, and the inclination angles θx and θy of these three injection nozzles 16 each have different angles.

Describing the first region, three injection nozzles 16a, 16b and 16c are bored, and injection nozzle 16c has a larger inclination angle θx in the X-axis direction compared to that of two injection nozzles 16a and 16b, and a smaller inclination angle θy in the Y-axis direction.

On the other hand, injection nozzle 16a has a smaller inclination angle θx in the X-axis direction compared to that of the two injection nozzles 16b and 16c, and a larger inclination angle θy in the Y-axis direction.

The inclination angle θx of the X-axis direction of injection nozzle 16b, and the inclination angle θy of the Y-axis direction, are between those of injection nozzle 16a and injection nozzle 16c.

For other injection nozzles 16a, 16b and 16c of the other regions, injection nozzles 16a, 16b and 16c of the first region are each turned through 90 degrees about the central axis of fuel injection valve 20, to give an axisymmetric form.

Since injection nozzles 16 are bored at respective angles in the plus direction and the minus direction with respect to the X-axis, when fuel injection is performed, two fuel sprays FA and FB are generated which widen in the side-by-side direction of the inlet valves 7A and 7B.

Furthermore, the inclination of injection nozzles 16 towards the Y-axis, is set in the plus direction for the first and second regions, and in the minus direction for the third and fourth regions. Therefore, injection sprays FA and FB are respectively formed with the two injection sprays juxtaposed up and down and formed as one integral spray pattern.

Consequently, near the center of the valve head of the inlet valve, the fuel flow quantity is small, and on the inlet system side and the exhaust system side from the valve head center, the flow quantity shows a peak value for each.

Therefore, if injected fuel attaches to the valve head of the inlet valve 7, the fuel liquid film formed near the center of the valve head of the inlet valve 7 becomes thinner than the fuel liquid film formed on the inlet system side and the exhaust system side of the valve head.

FIG. 5 shows the characteristics of the fuel spray for a case where the fuel is injected using fuel injection valve 20.

Figure 5A:
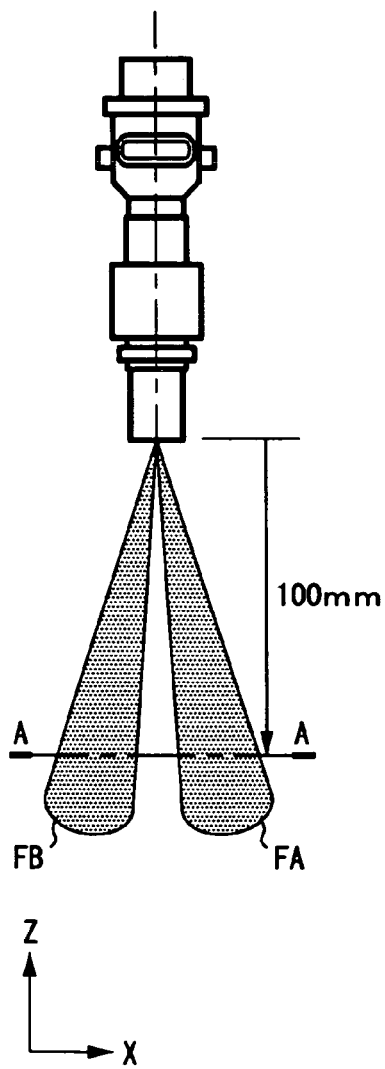
FIG. 5 is a schematic view of the fuel injection valve in the first embodiment of the present invention, showing its spray state.
Figure 5B:
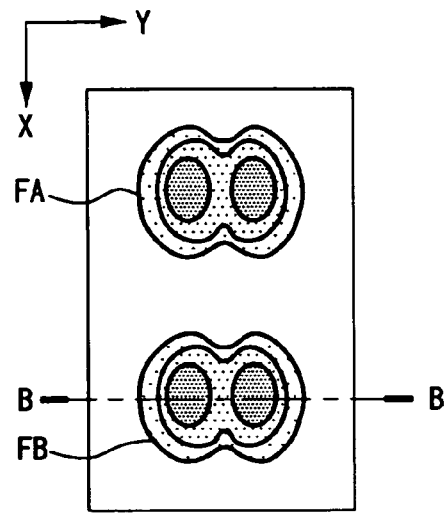
Figure 5C:
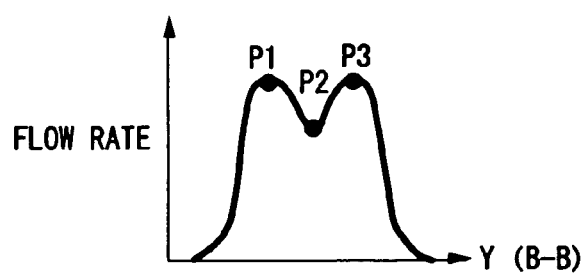

The flow distribution of FIGS. 5B and 5C, shows the flow rate characteristics at a time when the injected fuel passes through a cross-section A-A separated by 100 mm from the nozzle portion, as shown in FIG. 5A.

FIG. 5B shows regions where the flow rates at the A-A cross-section are the same. The regions with the denser coloring show greater flow rate.

FIG. 5C shows the flow distribution of the fuel spray passing through the center in the X-axis direction, on an axis parallel with the Y-axis.

As shown in FIGS. 5B and 5C, the flow rate at a central (B-B) cross-section of each of the fuel sprays FA and FB is low at the central portion, and shows a peak on both sides thereof. If the peak flow rates on both sides are respectively P1 and P3, and the flow rate at the central portion is P2, then P1 and P3 are approximately 1.5 times P2.

Next is a description of an attachment condition of the fuel with respect to inlet valve, in a case where fuel injection is performed using fuel injection valve 20.

The engine is one where the tumble control valve 31 is open, when operated at low load and low revolutions. Furthermore it is one where fuel injection by fuel injection valve 20 is performed during the exhaust stroke, before inlet valve 7 opens.

Figure 6:
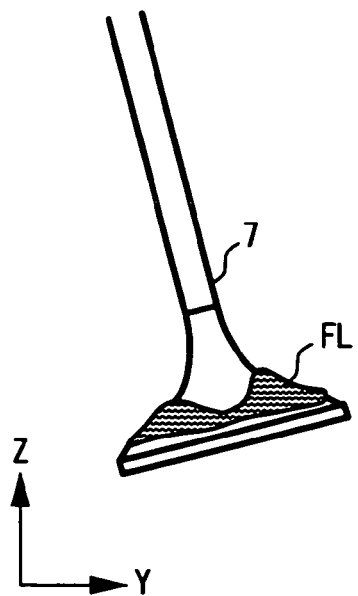
FIG. 6 is a schematic view of an inlet valve in the first embodiment of the present invention, showing a fuel attachment condition on the inlet valve.

During the exhaust stroke, since there is practically no air flow in the inlet pipe 5, the fuel spray F is not disturbed, and a liquid film is formed attached to the valve head of the inlet valve 7. FIG. 6 shows the formation situation of the liquid film FL on inlet valve 7 immediately after completion of fuel spraying.

The flow distribution of the fuel injected from fuel injection valve 20, as mentioned before, is reduced at the central portion of the valve head of the inlet valve, and the flow on the inlet system side and the exhaust system side of the valve head (i.e., the +Y direction side and the −Y direction side of the Y-axis with respect to the center of the inlet valve) is large. Therefore, the liquid film amount deposited on the central portion of the valve head of inlet valve 7 is small, and the liquid film amount to the +Y direction and the −Y direction from the central portion of the valve head of inlet valve 7 becomes larger compared to that for the central portion.

At the beginning of the inlet stroke, when inlet valve 7 begins to open, the pressure of the combustion chamber 4 falls below that of inlet pipe 5 due to lowering of the piston 3, so that air is drawn in to inside combustion chamber 4.

In inlet pipe 5, since rectifying plate 30 which partitions the inside into two upper and lower paths is provided, the air flows separately on the upper side and the lower side of rectifying plate 30. At this time, since a shearing stress acts on the surface of rectifying plate 30, the velocity of the air in the vicinity of the surface of rectifying plate 30 drops. Furthermore, also at the wall surface of inlet pipe 5, a shearing stress similarly acts, and hence for the gas flow in the upper and lower paths partitioned by rectifying plate 30, the velocity is high at the center of the flow in each path, and the velocity decreases towards the periphery.

Figure 12:
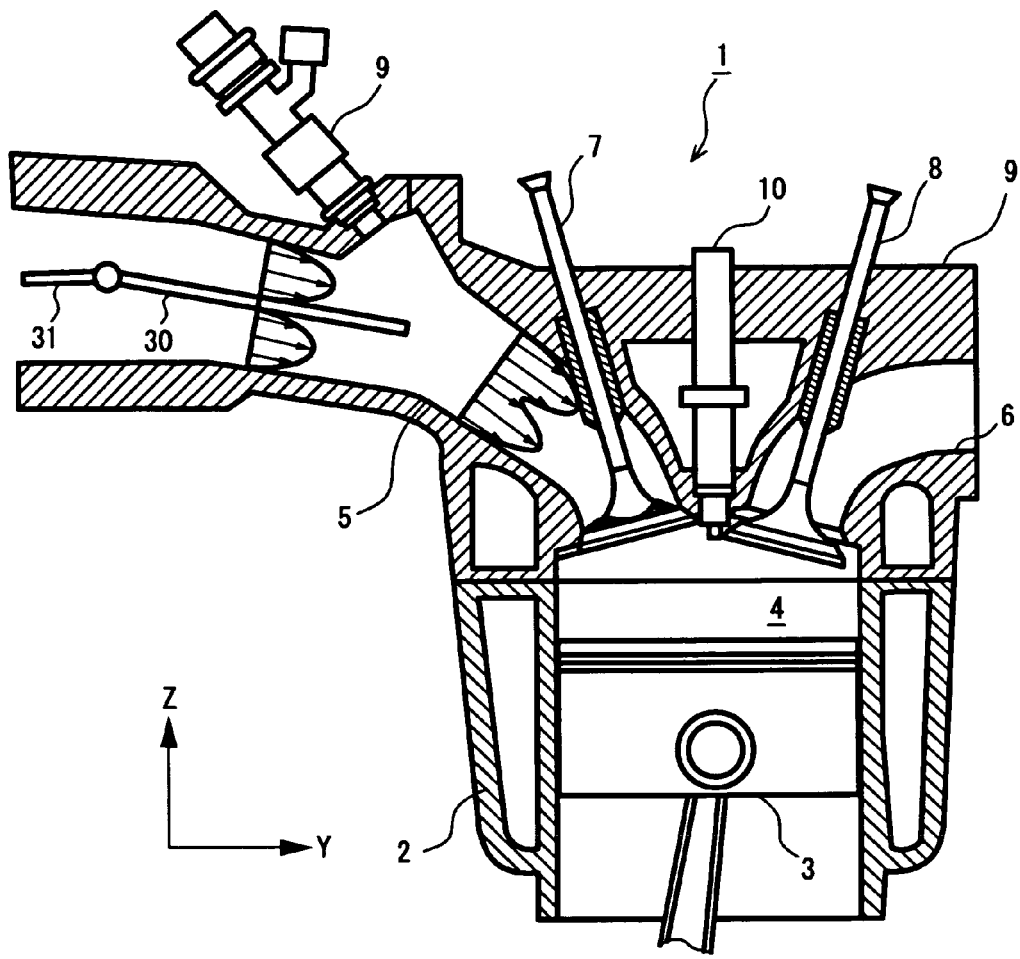
FIG. 12 is a cross-sectional view showing velocity distribution inside an inlet pipe during an inlet stroke in the first and second embodiments of the present invention.

FIG. 12 shows the velocity distribution of the air inside the inlet pipe 5 during the inlet stroke.

Even after the air has passed a path area where rectifying plate 30 is arranged, diffusion of the momentum of the air does not proceed immediately, and hence also on the downstream of rectifying plate 30, a velocity distribution having two peaks, i.e., upside and downside peaks disposed up and down is maintained.

Figure 7:
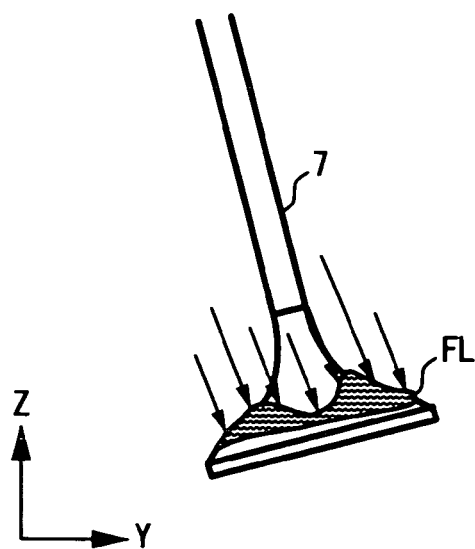
FIG. 7 is a schematic view of the inlet valve in the first embodiment of the present invention, showing distribution of air speed at a valve head thereof.

FIG. 7 shows the velocity vectors of the air which flows in towards inlet valve 7 during the inlet stroke. As shown in FIG. 7, the air flow velocity of the flow along the liquid film surface at the central portion of the valve head of the inlet valve 7 is slow, while the air flow velocity of the flow along the liquid film surface produced on the portion turn aside from the center of the valve head in the ±Y direction is fast.

The liquid film FL on the valve head of inlet valve 7 is vaporized due to the flow of air. The vaporization rate of the liquid film is expressed by the following equation (1).

$$m_v = K \cdot S \cdot (\rho_s - \rho_\infty) \quad (1)$$

where "$m_v$" is the vaporization rate (kg/s), "K" is the mass transfer rate (m/s), "S" is the surface area of the liquid film, "$\rho_s$" is the saturated vapor density (kg/m$^3$) of the liquid film surface, and "$\rho_\infty$" is the vapor density (kg/m$^3$) in air.

The mass transfer rate K in the above equation (1) is a function of flow velocity, and is expressed by equation (2).

$$\frac{Kd}{D} = 0.023 \left[ \frac{|V_g - V_f|d}{\nu} \right]^{0.8} S_c^{0.4} \quad (2)$$

where "d" is the diameter (m) of the inlet pipe, "D" is the diffusivity (m$^2$/s), "$V_g$" is the velocity of the air (m/s), "$V_f$" is the velocity of the liquid film (m/s), "$\nu$" is the kinematic viscosity of the air (m$^2$/s), and "$S_c$" is the Schmidt number.

As shown in equations (1) and (2), the higher the velocity of the air, the greater the vaporization rate of the liquid film.

Consequently, the vaporization rate of the liquid film of the fuel is slow near the center of the valve head where the flow rate is slow, while the vaporization rate of the liquid film generated on regions extending from the valve head center in ±Y direction is fast.

That is, in the present embodiment, by forming a large amount of liquid film at a position separated in the ±Y direction from the center of the valve head of inlet valve 7, where the vaporization rate is high, and reducing the liquid film amount on the valve head central portion where the vaporization efficiency is poor, the vaporization rate of the whole liquid film can be improved.

As a result, fuel in a liquid film state flowing into the inside of the combustion chamber can be decreased, and the amount of hydrocarbon HC discharged from the engine can be reduced.

Second Embodiment

Figure 8:
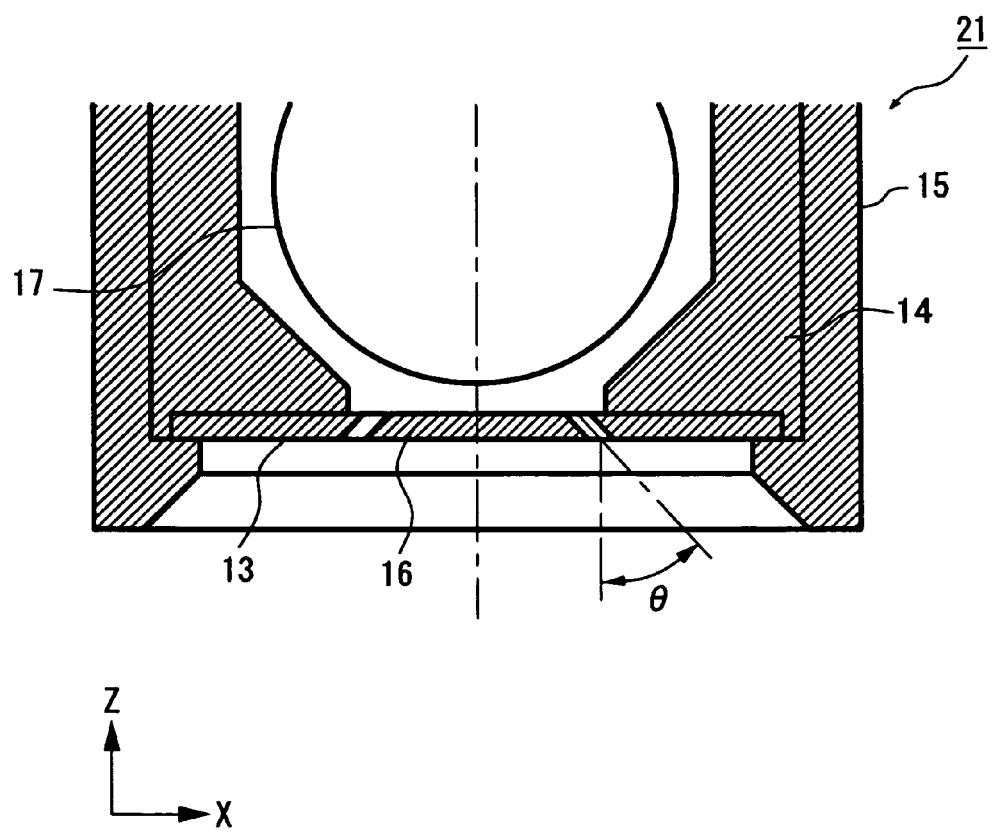
FIG. 8 is a cross-sectional view of a tip end of a fuel injection valve in a second embodiment of the present invention.
Figure 9:
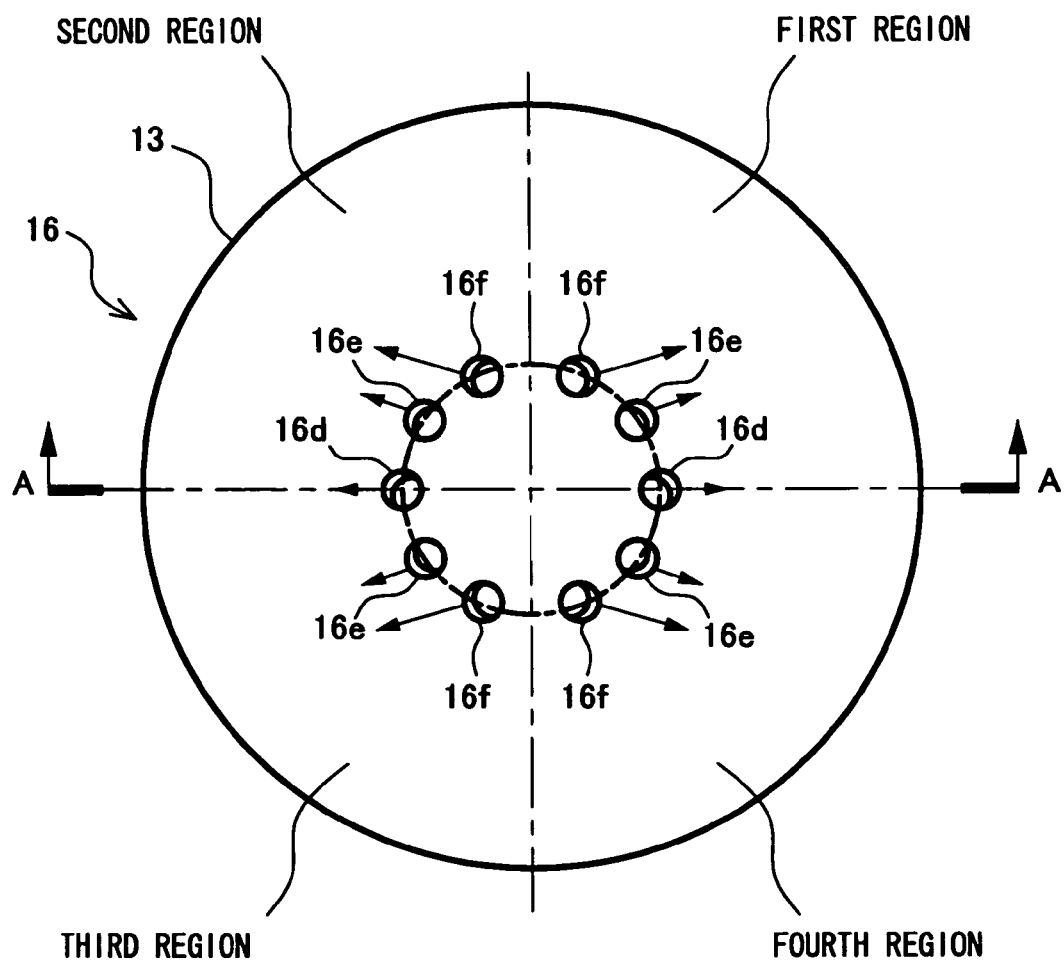
FIG. 9 is a planar view of a nozzle plate accommodated in the fuel injection valve in the second embodiment of the present invention.
Figure 9:
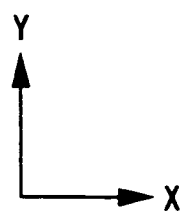

FIGS. 8 and 9 show a nozzle section 21 of a fuel injection valve 20 of a second embodiment. FIG. 8 is a longitudinal section of the nozzle section 21, and FIG. 9 is a view of nozzle section 21 seen from the tip end side.

Internal combustion engine which uses fuel injection valve 20 shown in FIG. 8 and FIG. 9, is similar to the first embodiment.

In the tip end of nozzle section 21 of fuel injection valve 20, a nozzle plate 13 is secured to a holder 15 by means of a guide 14.

In nozzle plate 13, a plurality of injection nozzles 16 are bored.

Inside holder 15 is provided a ball valve 17 capable of moving up and down, and by raising ball valve 17, a small gap between guide 14 and ball valve 17 allows fuel to flow, so that fuel is injected from injection nozzles 16.

Injection nozzles 16 are pierced at an incline with respect to the central axis of fuel injection valve 20, and an X-axis, a Y-axis, and a Z-axis, and a first region to a fourth region are defined similarly to the first embodiment.

Injection nozzle 16a inclination angle θy in the Y-axis direction is zero, but it has an incline in the X-axis direction.

On the other hand, injection nozzles 16b and 16c have an inclination in both the X-axis and the Y-axis direction.

The inclination angle θy of injection nozzle 16c in the Y direction is smaller than θy of injection nozzle 16b, while the inclination angle θx of the injection nozzle 16c in the X direction is larger than θx of injection nozzle 16b.

Furthermore, injection nozzles 16d, 16e, and 16f of the second region have symmetry in the Y-Z plane with respect to injection nozzles 16c, 16b, and 16a of the first region.

Injection nozzles of the third region and the fourth region, have symmetry in the X-Z plane with respect to the injection nozzles of the first region and the second region.

Nozzle plate 13 is provided at the tip end of fuel injection valve 20 so that the X-axis is parallel with the piston pin.

FIG. 10 shows a spray state for the case where fuel is injected using fuel injection valve 20 of the second embodiment.

Figure 10A:
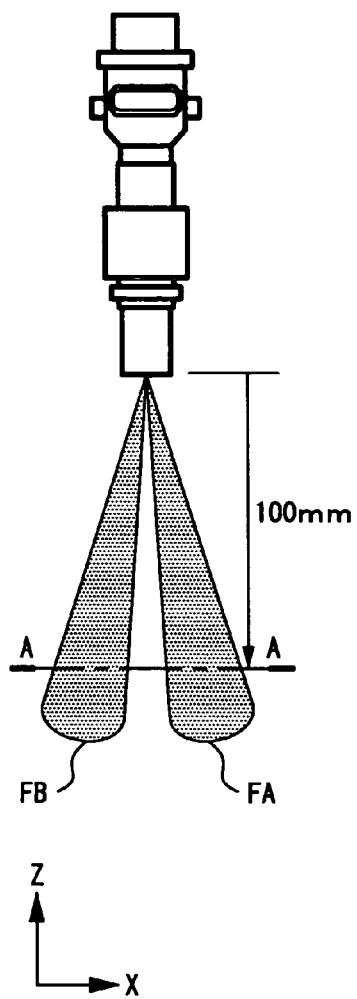
FIG. 10 is a schematic view of the fuel injection valve in the second embodiment of the present invention, showing its fuel spray state.

In this spray state, FIG. 10 shows a flow distribution of fuel spray F at a time when the injected fuel passes through a cross-section A-A, 100 mm below nozzle, as shown in FIG. 10A.

Figure 10B:
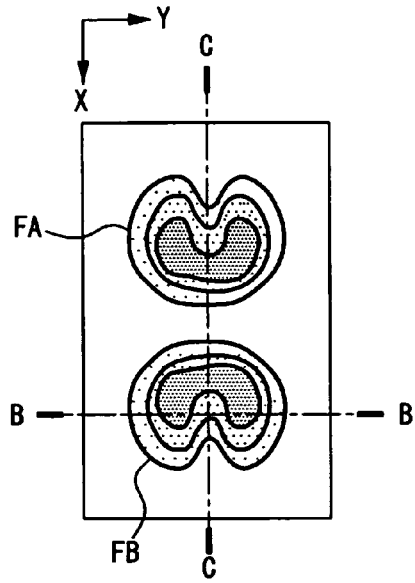
Figure 10C:
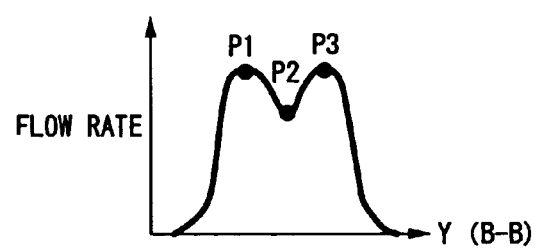
Figure 10D:
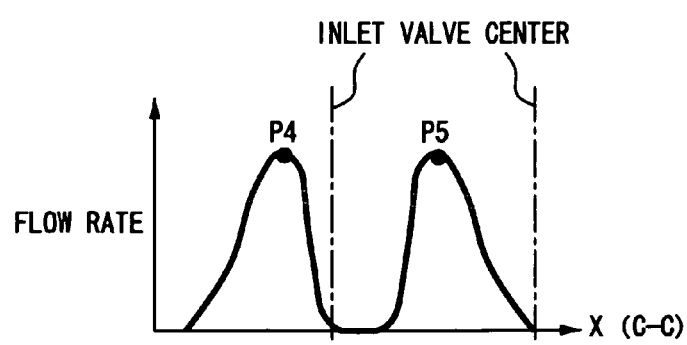

As shown in FIG. 10B, the flow distribution of the fuel sprays FA and FB are approximately symmetrical.

The flow distribution of the section B-B, becomes a distribution which is reduced at the central portion, and has peak values on the inlet system side and the exhaust system side on either side of the central portion. This is a distribution characteristic the same as for the first embodiment.

On the other hand, the flow distribution of the section C-C, is a distribution which is approximately zero at the central portion, and has two peaks at P4 and P5 on the opposite sides thereof. P4 and P5 are on the inside from the valve centers.

Figure 11A:
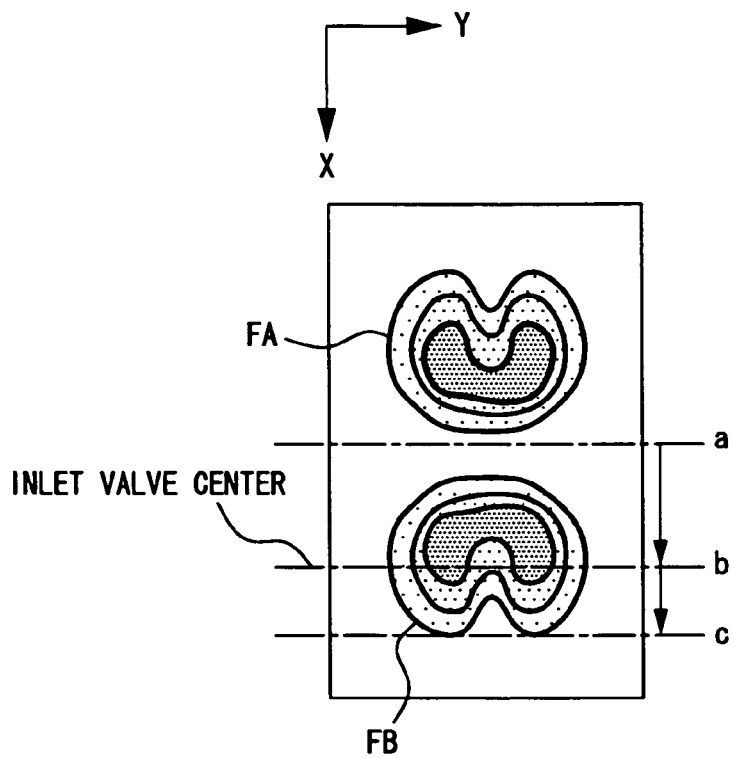
FIG. 11 is a diagrammatic view showing an overall flow rate for each region in the second embodiment of the present invention.
Figure 11B:
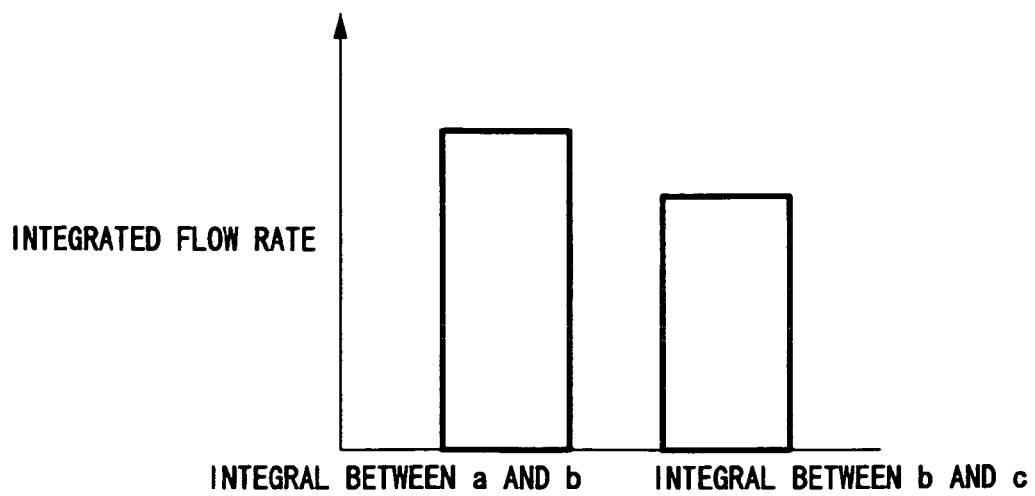

Furthermore, as shown in FIG. 11, if a central position between the fuel spray FA and the fuel spray FB is "a", a central position of the inlet valve is "b", and a position on the outermost side of the spray is "c", then the integrated value of the spray flow rate between "a" and "b" is set so as to be greater than the integrated value of the spray flow rate between "b" and "c".

Next is a description of an attachment condition of the fuel to the inlet valve, in a case where fuel injection is performed using fuel injection valve 20.

Now, for the brevity sake, it is assumed that engine 1 is operated at low load and low revolutions and the tumble control valve 31 is opened. Furthermore, it is assumed that fuel injection by fuel injection valve 20 is performed during the exhaust stroke, before inlet valve 7 opens.

The fuel is injected during the exhaust stroke, and fuel injection is commenced at a stage such that the fuel injection is completed at least before inlet valve 7 opens.

During the exhaust stroke, since there is practically no air flow in inlet pipe 5, the fuel spray F is not disturbed, and a liquid film is formed attached to the valve head of the inlet valve 7.

The flow distribution, as mentioned before, is reduced at the central portion of the valve head of the inlet valve 7, and the flow on the inlet system side and the exhaust system side of the inlet valve 7 (i.e., the +Y direction side and the −Y direction side with respect to the center of the inlet valve) is large. Furthermore, the flow on the inside of two inlet valves 7A and 7B is large, and is small on the outside, and the amount of liquid film for the portion where the flow is large is great.

The inside of two inlet valves 7A and 7B means the side sandwiched by two inlet valves 7A and 7B.

At the beginning of the inlet stroke, when inlet valve 7 begins to open, the air is drawn in to inside the combustion chamber 4 due to lowering of the piston 3.

In inlet pipe 5, since there is rectifying plate 30, the air flows separately on the top side and the bottom side of rectifying plate 30.

At this time, since a shearing stress acts on the surface of the rectifying plate 30, the velocity of the air in the vicinity of the surface of rectifying plate 30 drops. Furthermore, also at the wall surface of inlet pipe 5, a shearing stress similarly acts, and hence the gas flow which flows on the top and bottom paths of the rectifying plate 30, has a velocity distribution where the velocity is higher at the center of the respective flow paths.

FIG. 12 shows the velocity distribution of the intake air inside inlet pipe 5 during the inlet stroke.

Also after the air has passed the area where rectifying plate 30 is arranged, diffusion of the momentum of the air does not proceed immediately, and hence also on the downstream of the rectifying plate 30, a velocity distribution having two peaks, one at the upside and the other at the downside, is maintained.

That is, the air flow velocity of the flow along the liquid film surface at the central portion of the valve head of inlet valve 7 is slow, while the air flow velocity of the flow along the liquid film surface formed in the ±Y direction from the center of the valve head of inlet valve 7 is fast. As a result, vaporization of the liquid film which is formed in the ±Y direction from the center of the valve head of inlet valve 7 is promoted.

Meanwhile, the behavior of the liquid film which is formed on the inside of two inlet valves 7, will be described using FIG. 13.

Figure 13:
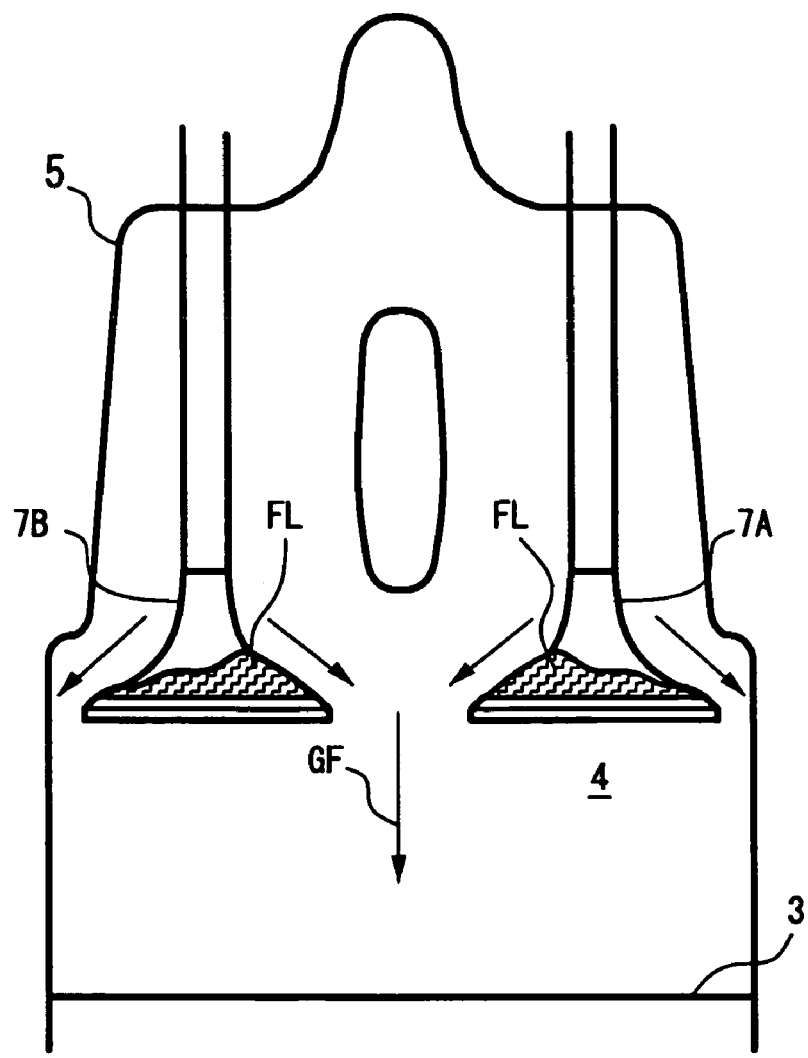
FIG. 13 is a schematic diagrammatic view of the vicinity of an inlet valve of an internal combustion engine seen from an exhaust valve side, in the first and second embodiments of the present invention.

FIG. 13 is a view of the engine during the inlet stroke, from the exhaust pipe side.

As described above, in the present embodiment, the liquid film amount on the inside of two inlet valves 7 is greater than that on the outside of two inlet valves 7.

In the inlet stroke, the air from inlet pipe 5 enters into the combustion chamber from the periphery of inlet valve 7. In the engine of the present embodiment, the air which has entered from the inside of inlet valve 7A collides with the air which has entered from inlet valve 7B, so that the air flow from both sides is combined, and becomes a strong air flow GF, which descends into the combustion chamber.

Part of the liquid film FL produced on the inside of two inlet valves 7 flows in a liquid phase condition to inside the combustion chamber, as a result of the gas flow which flows on the inside of inlet valve 7. However, due to this strong air flow GF, atomization and vaporization is promoted, so that this is gasified inside the combustion chamber.

Furthermore, the liquid film which has entered from the inside of two inlet valves 7 becomes faster with distance from the wall surface of the combustion chamber. Moreover, since the direction of the flow GF is in the axial direction of the combustion chamber, this does not readily attach to the wall surface of the combustion chamber.

On the other hand, regarding the liquid film which has entered from the outside of two inlet valves 7, since the distance to the wall surface of the combustion chamber is near, and the flow direction there is towards the combustion chamber wall surface, this readily collides with the combustion chamber wall surface.

The liquid phase fuel which has collided with the wall surface of the combustion chamber forms a wall flow, and hence does not readily evaporate, and is discharged without being combusted, so that the hydrocarbons HC discharged from the engine are increased.

That is, in the second embodiment, by producing the liquid film on inlet valves 7 in a large amount in the ±Y direction from each inlet valve center, this has the same affect as for the first embodiment. Moreover, by forming a large amount of liquid film on the inside of two inlet valves 7 (7a and 7b), the occurrence of wall flow on the combustion chamber can be suppressed, and the vaporization of the liquid film formed on the inside of two inlet valves 7a and 7b can be promoted by using the high speed gas flow which passes on the inside of the two inlet valves and enters into the combustion chamber. As a result, discharge of hydrocarbons HC from the engine can be suppressed.

Third Embodiment

Figure 14:
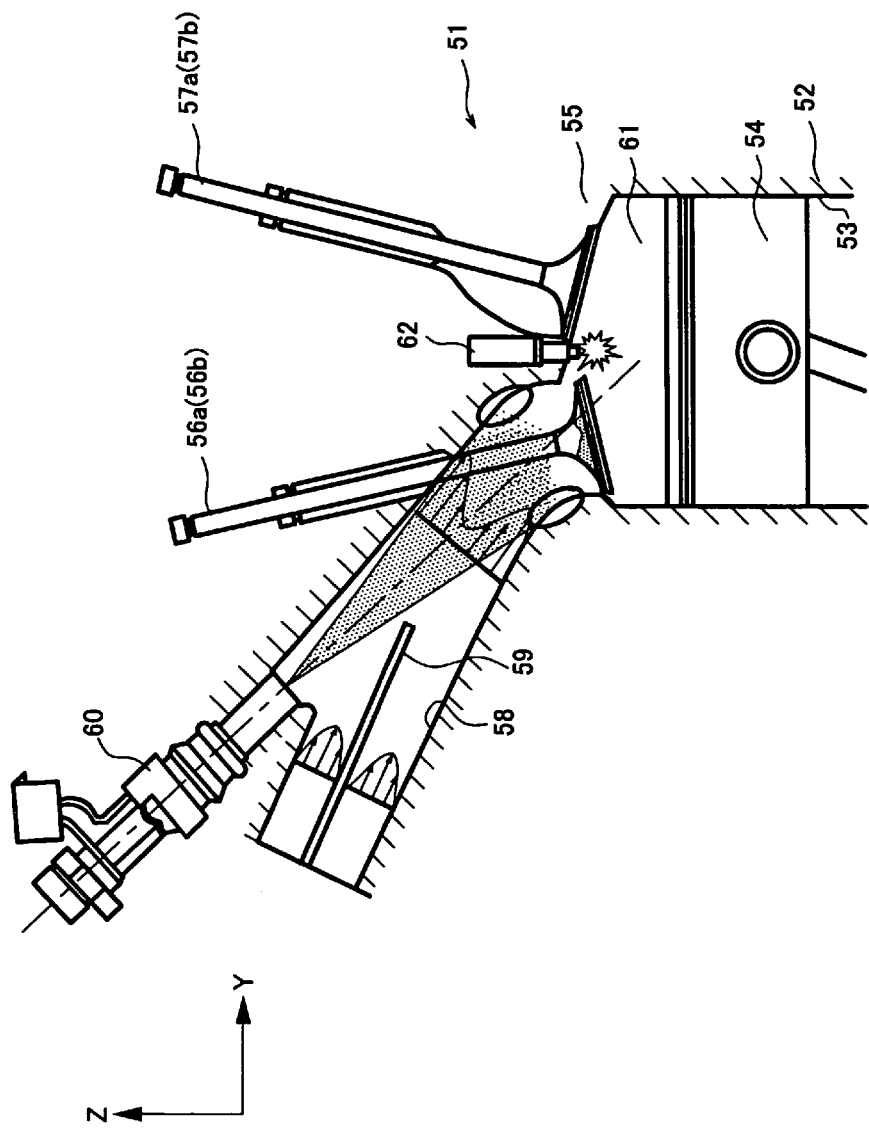
FIG. 14 is a cross-sectional view of an internal combustion engine in a third embodiment of the present invention.
Figure 15:
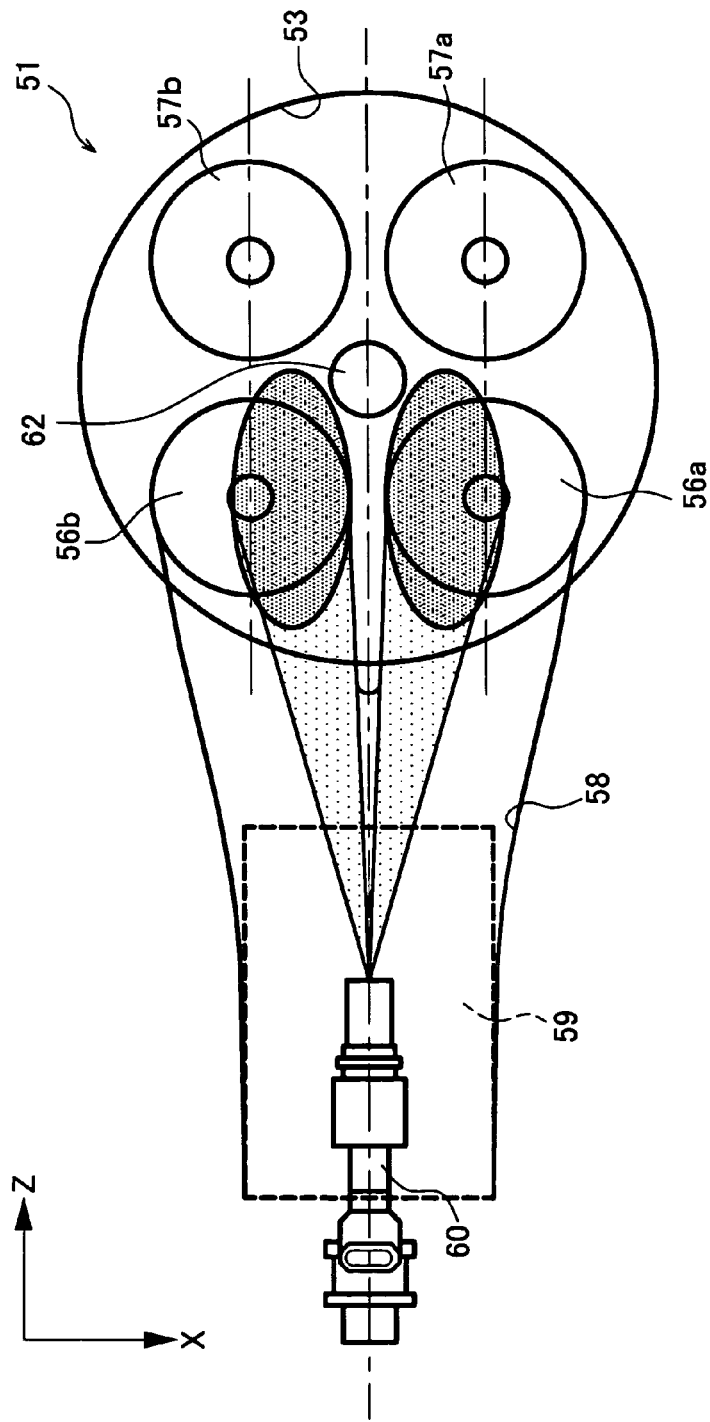
FIG. 15 is a plan view of the internal combustion engine in the third embodiment of the present invention.

FIG. 14 is a cross-sectional view of an internal combustion engine, and FIG. 15 is a plan view of FIG. 14.

As shown in FIGS. 14 and 15, in an internal combustion engine 51, a piston 54 is inserted into a cylinder 53 formed in a cylinder block 52, so as to be capable of reciprocating in cylinder 53.

A cylinder head 55 is fitted to the top of cylinder 53, and a combustion chamber 61 is formed by the head of the piston 54, and cylinder head 55.

A spark plug 62 is provided at a central portion of cylinder head 55. Furthermore, two inlet valves 56a and 56b, and two exhaust valves 57a and 57b are arranged in the cylinder head 55 with the spark plug 62 at the center.

An inlet port 58 which is connected to valve seats of two inlet valves 56a and 56b is formed in cylinder head 55. Inlet port 58 extends from diagonally above cylinder 53 to the cylinder head 55, and is branched into two along the way, and connected to the valve seats of respective inlet valves 56a and 56b.

On an upstream side of a branch point of inlet port 58 is provided a rectifying plate 59 which partitions the air distribution channel inside the inlet port 58 into two upper and lower channels viewed in the direction of axis of cylinder 53.

Here, similarly to the engine 1 of the first embodiment shown in FIG. 1, there is provided a valve for opening/closing the air path on the lower channel side partitioned by rectifying plate 59, and by closing this valve, the tumble flow inside the cylinder can be intensified.

However, it should be understood that the characteristic of the aforementioned air movement inside inlet port 58 shows the characteristic for the case where air flows through both the air paths, namely the air path on the lower channel side of rectifying plate 59 and the air path on the upper channel side.

Furthermore, on the upper channel side of inlet port 58 further on the upstream side from the branch point of inlet port 58, is fitted an injection valve 60. Injection valve 60 is opened by lifting the valve body by an electromagnetic attraction force by means of an electromagnetic coil, and injects fuel in two directions aimed at respective inlet valves 56a and 56b.

The fuel injected from injection valve 60 is for example gasoline.

The position of rectifying plate 59, and the position of injection valve 60 as well as the spray angle are set so that rectifying plate 59 does not interfere with the fuel spray from injection valve 60.

The fuel sprayed from injection valve 60 is drawn in to inside combustion chamber 61 together with air via inlet valves 56a and 56b. Fuel inside the combustion chamber 61 is ignited by spark ignition by spark plug 62, and kinetic energy pushing piston 54 downwards is produced. Then, the exhaust gas is discharged from inside combustion chamber 61 via exhaust valves 57a and 57b.

Here, the shape of the fuel spray which is sprayed from injection valve 60 towards each of inlet valves 56a and 56b, is set to become a shape, in a plane perpendicular to the flow of the air, which is lengthened in a direction corresponding to the direction in which the inlet port 58 interior is partitioned into upper and lower by rectifying plate 59.

Furthermore, the central axes of the fuel sprays which are sprayed from injection valve 60 towards each of inlet valves 56a and 56b are set so as to pass through positions which are displaced from the centers of the valve heads of inlet valves 56a and 56b toward the side near the adjacent inlet valves 56a and 56b.

Moreover, the fuel injected from injection valve 60 impinges upon the regions of the valve heads of inlet valves 56a and 56b which are close to the adjacent inlet valves 56a and 56b. Furthermore at the top and bottom, it impinges upon each of the corresponding inside walls of inlet port 58 (refer to FIG. 15).

In the case where rectifying plate 59 is provided in inlet port 58, the air movement inside inlet port 58 becomes strong at the top and bottom on either side of rectifying plate 59, and the inside wall of inlet port 58 upon which the fuel spray impinges becomes a region where the air movement is strong due to rectifying plate 59.

Consequently, regarding the fuel spray which impinges upon the inside wall of inlet port 58, even at the time of low temperature starting, vaporization is promoted by the environment in which the air movement is strong.

On the other and, as a result of the one part of the fuel spray impinging upon the inside wall of inlet port 58, the direct discharge rate of the fuel onto the valve head of inlet valves 56a and 56b drops. As a result, in a condition where the temperature of inlet valves 56a and 56b at the time of low temperature starting is low, the film thickness of the liquid fuel attached to the valve head can be thinned, so that the speedup of the vaporization rate of the fuel attached to the valve head can be achieved.

Figure 16:
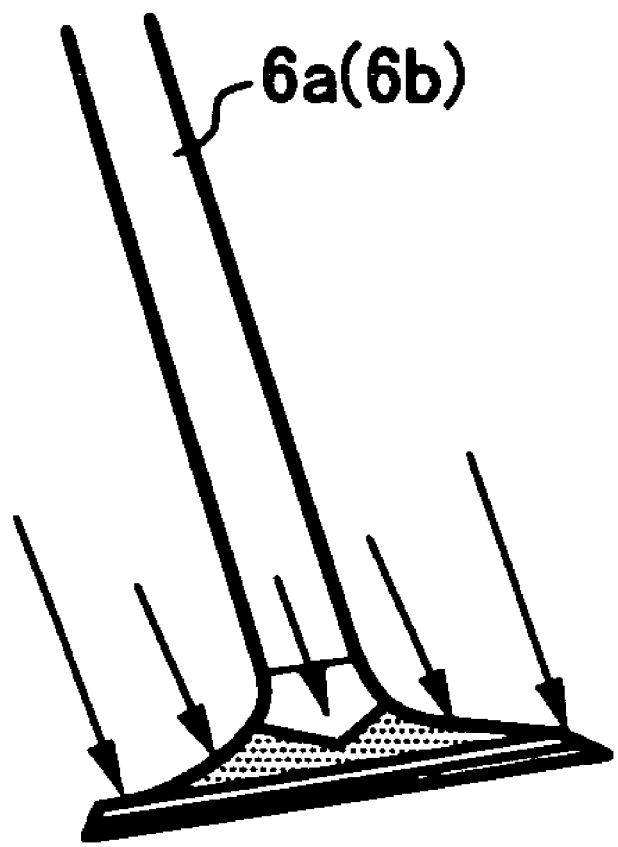
FIG. 16 is a schematic view showing distribution of strength of air movement at a valve head of the inlet valve in the third embodiment of the present invention.

As shown in FIG. 16, in the valve head of inlet valves 56a and 56b, the air movement on the two sides of the central portion is strong, and at the portion where the air movement is strong, the film thickness of the liquid fuel is thin, so that a high vaporization rate is obtained. However, at the central portion of the valve head, the air movement is relatively weak, so that the film thickness of the liquid film thickens.

Here, by directly discharging the fuel also onto the inside wall of inlet port 58, the direct discharge rate with respect to the valve head of inlet valves 56a and 56b is reduced, and the film thickness of the liquid fuel attached to the valve head including the portion near the center of the valve head where the air movement is relatively weak can be made thin all over.

Consequently, compared to the case where all of the fuel spray impinges upon the valve head of inlet valves 56a and 56b, vaporization in the interior of the inlet port 58 at the time of low temperature starting can be promoted, and the fuel air mixture at the time of low temperature starting can be homogenized, and the discharge amount of hydrocarbon HC can be reduced.

Next the setting of the spray angle of the injection valve 60 will be described in more detail.

Figure 17A:
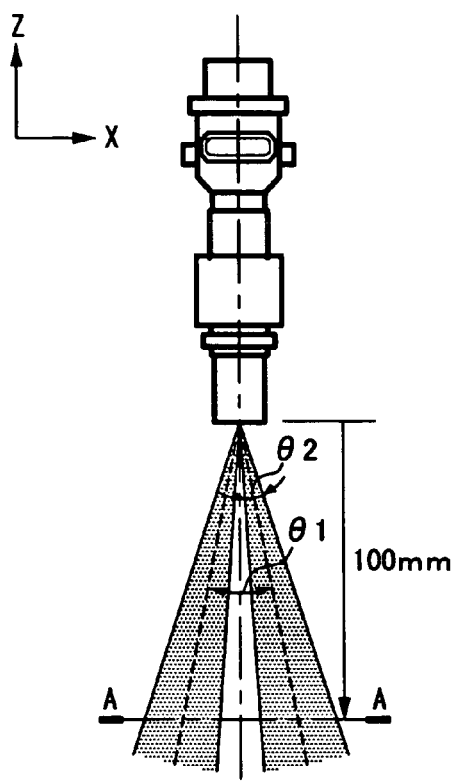
FIG. 17 is a diagrammatic view for explaining parameter for specifying spray angle in the third embodiment of the present invention.
Figure 17B:
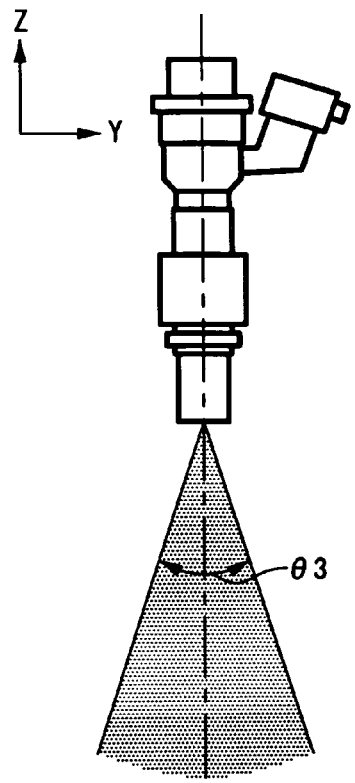
Figure 17C:
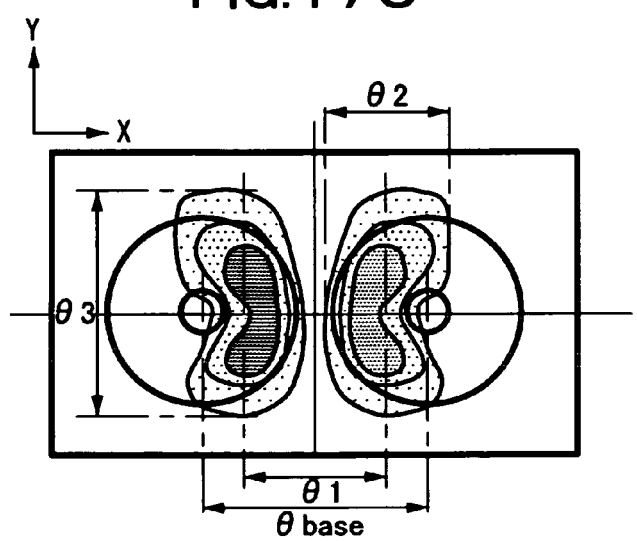

At first, as shown in FIGS. 17A, 17B, and 17C, orthogonal to rectifying plate 59, the spread angle (the spread angle in the substantially vertical direction) of the fuel spray in the plane including the central axis of one of the fuel sprays is $\theta 3$, the angle that the two fuel sprays directed towards respective inlet values 56a and 56b defined by the respective central axes is "$\theta 1$", and the spread angle (spread angle in the lateral direction) of the fuel sprays in the plane including the central axis of the two fuel sprays is "$\theta 2$". Moreover, with the spray position of injection valve 60 as a base point, the angle subtended by the lines connecting the base point to the respective centers of two inlet valves 56a and 56b is "$\theta_{base}$".

The above angles $\theta 1$, $\theta 2$, $\theta 3$ and $\theta_{base}$ are set so as to satisfy the following relationship.

Figure 18A:
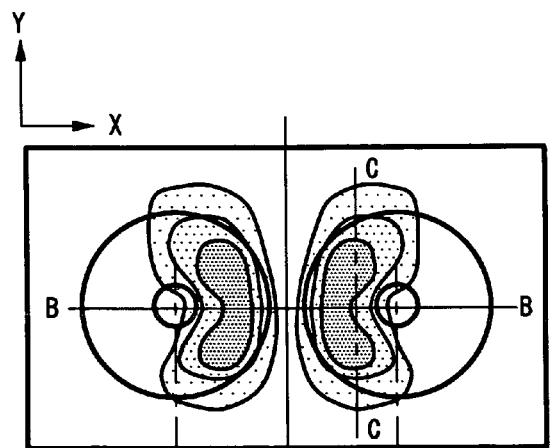
FIG. 18 is a graphical view showing a flow amount distribution of the fuel spray in the third embodiment of the present invention.
Figure 18B:
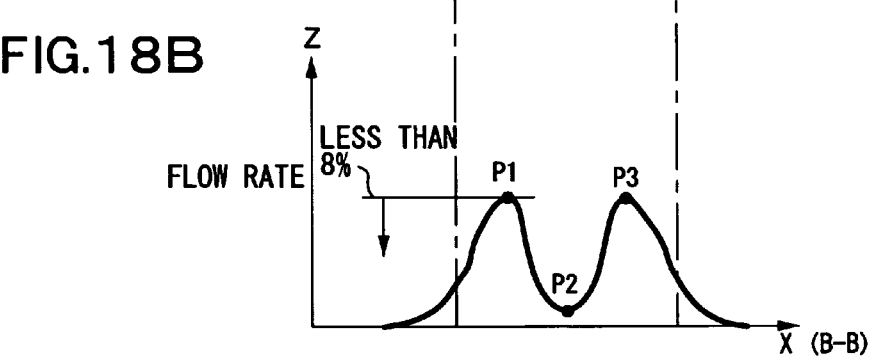
Figure 18C:
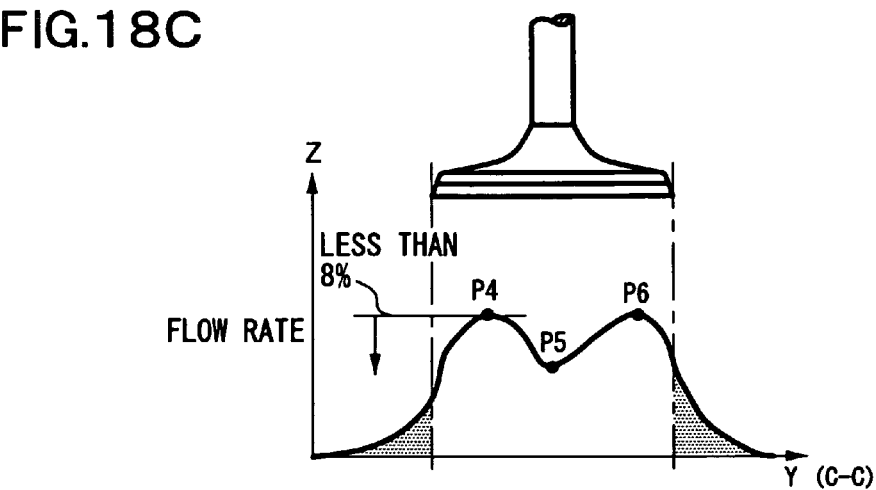

$\theta 1$: 65 to 75% of $\theta_{base}$
$\theta 2$: 60 to 70% of $\theta_{base}$
$\theta 3$: 75 to 85% of $\theta_{base}$ Furthermore, the flow distribution of the fuel spray which impinges upon the valve head of inlet valves 56a and 56b, and the inside wall of inlet port 58 is as shown in FIGS. 18A, 18B, and 18C.

FIGS. 18A, 18B, and 18C shows the flow distribution in a transverse section approximately 100 mm from the tip end of injection valve 60.

Regarding the flow distribution on the line which joins the centers of the valve heads of two inlet valves 56a and 56b (the flow distribution on the section B-B), as shown in FIG. 18B, at the central portion the flow rate P2 is approximately 0%, and at the two sides, the flow rate shows peak values P1 and P3. The positions where the flow rate becomes the peak values P1 and P3 are inside from the center of valve heads of inlet valves 56a and 56b.

Furthermore, regarding the flow distribution in the longitudinal direction of the fuel spray for which the cross-section is an approximate oval shape, that is, the flow distribution in the substantially vertical direction of inlet port 58 (the flow distribution in the C-C section), as shown in FIG. 18C, the flow rate at the center of the valve head is minimal, and becomes a distribution showing a peak value P4 and P6 on both sides of the valve head.

Here, the peak values P1, P3, P4, and P6 are all set so as to become less than 8%. Furthermore, the volume of the fuel which is attached to the valve head of the inlet valves 56a and 56b, is set so as to be within a range of 20 to 50 mm$^3$.

In the case where the fuel is injected aimed at the central portion of the valve heads of inlet valves 56a and 56b, and the whole of the fuel spray impinges upon the valve heads of the inlet valves 56a and 56b, the flow distribution at the center of the valve heads becomes a peak, and the peak value becomes approximately 15%.

In the above manner, the fuel spray impinges upon the valve heads of the inlet valves 56a and 56b, and also upon the inside wall of the inlet port 58, so that the impinging rate of the fuel spray onto the valve heads of the inlet valves 56a and 56b is reduced. Therefore, even at the time of low temperature starting, the thin film of the liquid fuel attached to the valve heads can be kept from becoming thick.

Meanwhile, in order to reduce the direct discharge rate onto the valve heads of inlet valves 56a and 56b, the fuel spray impinges upon the inside wall of the inlet port 58. However the inside wall portion of inlet port 58 upon which the fuel spray impinges, is a region where the air movement is strong due to rectifying plate 59. Therefore, the fuel which impinges upon the inside wall of inlet port 58 can be efficiently vaporized.

Consequently, even for example at the time of low temperature starting, a large amount of fuel does not flow into combustion chamber 61 in the liquid state, and hence the amount of hydrocarbon HC discharged from the engine can be reduced.

Furthermore, in the case where two inlet valves 56a and 56b are provided in each cylinder, the air movement is strong at the top and bottom of the regions on inside of the centers of the valve heads of two inlet valves 56a and 56b.

Consequently, by displacing the center lines of the fuel sprays directed towards inlet valves 56a and 56b, from the centers of the valve heads to the side close to adjacent inlet valves 56a and 56b, the fuel spray can impinge upon the region where the air movement of the inside wall of the inlet port 58 is the strongest, so that the vaporization rate can be made even faster.

Figure 19:
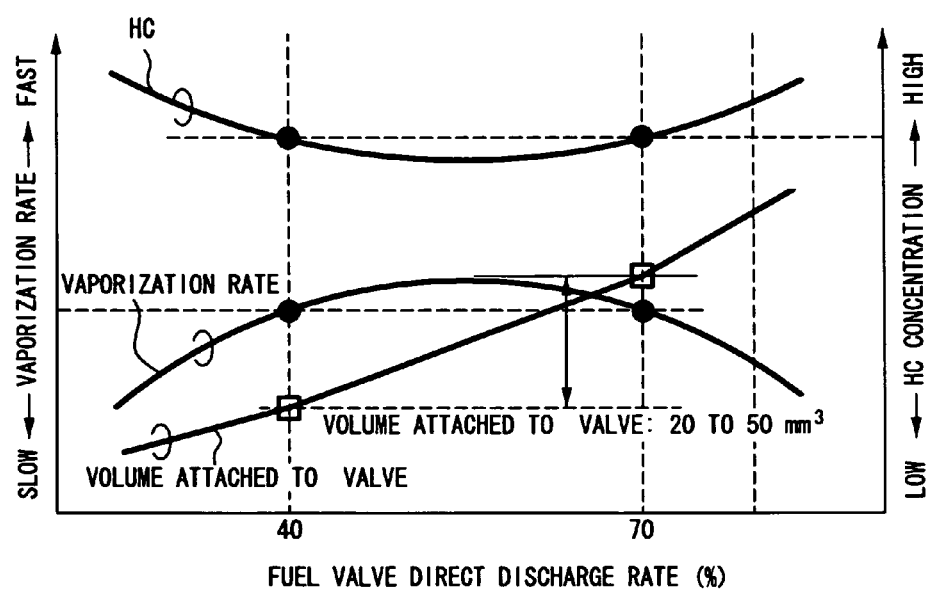
FIG. 19 is a graph showing a correlation between spray direct discharge rate, vaporization rate, and HC concentration, with respect to the inlet valve, in the third embodiment of the present invention.

FIG. 19 describes the characteristics of the spray in the fuel injection apparatus and the fuel injection valve, based on the direct discharge rate of the fuel onto the valve heads of the inlet valves 56a and 56b.

As shown in FIG. 19, if the direct discharge rate of the fuel onto the inside portions of the inlet valves 56a and 56b is within a range of 45% to 70%, the vaporization rate on the valve heads is above a reference value, and the concentration of hydrocarbon HC discharged from the internal combustion engine 51 can be kept below the critical value.

By keeping the direct discharge rate of the fuel within the range of 45% to 70%, the volume of fuel adhered to the valve heads of the inlet valves 56a and 56b can be made 20 to 50 mm$^3$.

Furthermore, in a condition where the distance between the cylinder bore and the opening rim of the inlet port 58 for the combustion chamber 61 is close, then when the fuel spray impinges upon the inside wall of the inlet port 58, liquid fuel which could not be sufficiently vaporized is directly dragged into the air flow inside the cylinder, so that there is the likelihood of preventing a homogeneous mixture formation.

Therefore, in a condition where the distance between the cylinder bore and the opening rim of the inlet port 58 for the combustion chamber 61 is greater than a predetermined value, the center lines of the fuel sprays directed towards the inlet valves 56a and 56b are displaced to the side close to the adjacent other inlet valves 56a and 56b, so that the fuel sprays impinge upon the inside wall of the inlet port 58.

Consequently, even in the case where the fuel sprays which impinge upon the region of the inside wall of the inlet port 58 where the air movement is strong, cannot be sufficiently vaporized, the situation where fuel spray in liquid form becomes directly dragged into the air flow inside the cylinder can be avoided.

In an internal combustion engine furnished with only one inlet valve for each cylinder, the fuel spray is set to a lengthened shape in a direction of partitioning the inlet port interior by the rectifying plate 59, and by respectively directly discharging this fuel in the longitudinal direction against each of the valve head of the inlet valve and the inside wall corresponding to the inlet port, the same operation and effect as for the aforementioned embodiments can be obtained.

Moreover, the shape of the combustion chamber 61, and the position of the spark plug with respect to the combustion chamber 61, is not limited to the configuration shown in FIG. 14.

Furthermore, the spray angle of the injection valve 60 can be variably configured, and the fuel spray in low temperature conditions can impinge respectively upon the valve heads of the inlet valves 56a and 56b, and the inside wall corresponding to the inlet port 8, and after warming up, the fuel spray can impinge upon only the valve heads of the inlet valves 56a and 56b.

For the injection valve 60 in the third embodiment, the fuel injection valve having the nozzle plate as shown in FIGS. 8 and 9 can be used.

The entire contents of Japanese Patent Application No. 2005-263167, filed Sep. 12, 2005, Japanese Patent Application No. 2005-285213, filed Sep. 29, 2005, and Japanese Patent Application No. 2006-199281, filed Jul. 21, 2006 are incorporated herein by reference.

While only selected embodiments have been chosen to illustrate the present invention, it will be apparent to those skilled in the art, from this disclosure that various changes and modifications can be made herein without departing from the scope of the invention as defined in the appended claims.

Furthermore, the foregoing description of the embodiments according to the present invention are provided for illustration only, and not for the purpose of limiting the invention as defined by the appended claims and their equivalents.

We claim:

1. A fuel injection apparatus for an internal combustion engine having two inlet valves provided for each cylinder, the fuel injection apparatus comprising:
   a fuel injection valve fitted to an inlet pipe on an upstream side of the two inlet valves;
   wherein the fuel injection valve is arranged to inject fuel in a form of a fuel spray towards each of the two inlet valves, and
   wherein the injected fuel spray shows a flow distribution at a valve head of each of the inlet valves, in which flow distribution a flow amount at both locations on an exhaust system side and on an intake system side of respective centers of the respective valve heads is set to be local maximum values, and a line between two points, at which the flow amount indicates local maximum values, on the respective valve heads, is set to be displaced from the respective centers of the respective valve heads towards the respective adjacent inlet valve.

2. A fuel injection apparatus for an internal combustion engine according to claim 1, wherein the fuel spray is set so that a spray pattern thereof viewed in a plane perpendicular to a flow direction of the fuel spray injected from the fuel injection valve is elongated in a direction perpendicular to a direction of arrangement of the two inlet valves, and the fuel spray with the elongated spray pattern in a longitudinal direction impinges respectively upon the valve head of each inlet valve, and onto opposed inside walls of the inlet pipe.

3. A fuel injection apparatus for an internal combustion engine according to claim 2, wherein a percentage of a volume of the fuel spray that impinges upon the valve heads of the inlet valves, of a total fuel volume injected from the fuel injection valve, is within a range of 40% to 70%.

4. A fuel injection apparatus for an internal combustion engine according to claim 1, wherein a total volume of fuel spray in respective regions, from a center between the two inlet valves to respective centers of each inlet valve, is greater than a total volume of fuel spray in lateral regions outside the respective centers of each inlet valve.

5. A fuel injection apparatus for an internal combustion engine according to claim 1,
wherein the fuel injection valve comprises a nozzle plate having therein a plurality of injection nozzles,
wherein the plurality of injection nozzles of the nozzle plate are formed in a manner such that more than one of the plurality of injection nozzles are disposed with respect to each of four regions defined about a center of the nozzle plate, and fuel injected from the injection nozzles in each of the four regions forms a single spray, to thereby form four fuel sprays in total, which are aimed in mutually different directions, and
wherein groups of two of the four fuel sprays are aimed at each inlet valve.

6. A fuel injection apparatus for an internal combustion engine according to claim 5, wherein the plurality of injection nozzles in the nozzle plate of the fuel injection valve are arranged concentrically about a center of the nozzle plate.

7. A fuel injection apparatus according to claim 1, further comprising a rectifying plate which is configured to divide an air flow channel of the inlet pipe into two separate channels which are arranged side by side and extend in a direction of an axis of a piston.

8. A fuel injection valve fitted to an inlet pipe of an internal combustion engine which is provided with two inlet valves provided for each cylinder,
wherein the inlet pipe is arranged to inject fuel in a form of a fuel spray toward each of the two inlet valves, and
wherein the injected spray shows a flow distribution at a valve head of each of the inlet valves, in which flow distribution a flow amount at both locations on an exhaust system side and on an intake system side of respective centers of the respective valve heads is set to be local maximum values, and a line between two points, at which the flow amount indicates local maximum values, on the respective valve heads, is set to be displaced from the respective centers of the respective valve heads towards the respective adjacent inlet valve.

9. A fuel injection valve according to claim 8, wherein the fuel spray is set so that a spray pattern thereof viewed in a plane perpendicular to a flow direction of the fuel spray injected from the fuel injection valve is elongated in a direction perpendicular to a direction of arrangement of the two inlet valves, and the fuel spray with the elongated spray pattern in a longitudinal direction impinges respectively upon the valve head of each inlet valve, and onto opposed inside walls of the inlet pipe.

10. A fuel injection valve according to claim 9, wherein a percentage of a volume of the fuel spray that impinges upon the valve heads of the inlet valves, of a total fuel volume injected from the fuel injection valve, is within a range of 40% to 70%.

11. A fuel injection valve according to claim 8, wherein a total volume of fuel spray in respective regions, from a center between the two inlet valves to respective centers of each inlet valve, is greater than a total volume of fuel spray in lateral regions outside the respective centers of each inlet valve.

12. A fuel injection valve according to claim 8,
wherein the fuel injection valve comprises a nozzle plate having therein a plurality of injection nozzles,
wherein the plurality of injection nozzles of the nozzle plate are formed in a manner such that more than one of the plurality of injection nozzles is disposed with respect to each of four regions defined about a center of the nozzle plate, and fuel injected from the injection nozzles in each of the four regions forms a single spray, to thereby form four fuel sprays in total, which are aimed in mutually different directions, and
wherein groups of two of the four fuel sprays are aimed at each inlet valve.

13. A fuel injection valve according to claim 12, wherein the plurality of injection nozzles are arranged concentrically with the center of the nozzle plate.

14. A fuel injection valve according to claim 8, wherein the internal combustion engine is provided with a rectifying plate configured to divide an air flow channel of the inlet pipe into two separate channels which are arranged side by side and extend in a direction of an axis of a piston.

15. A method of controlling fuel injection of an internal combustion engine having two inlet valves provided for each cylinder and a fuel injection valve fitted to an inlet pipe on an upstream side of the two inlet valves, comprising at least the step of:
injecting fuel from the fuel injection valve towards respective valve heads of each of the two inlet valves in a manner such that the injected fuel spray shows a flow distribution at the respective valve heads of each of the inlet valves, in which flow distribution a flow amount at both locations on an exhaust system side and on an intake system side of respective centers of the respective valve heads is set to be local maximum values, and a line between two points, at which the flow amount indicates local maximum values, on the respective valve heads, is set to be displaced from the respective centers of the respective valve heads towards the respective adjacent inlet valve.

16. A method of controlling fuel injection of an internal combustion engine according to claim 15, wherein the step of injecting fuel comprises injecting the fuel towards the respective valve heads of the two inlet valves and towards an inlet pipe inside wall on the inlet system side and on the exhaust system side centered on the respective valve heads.

17. A method according to claim 15, wherein the internal combustion engine is provided with a rectifying plate configured to divide an air flow channel of the inlet pipe into two separate channels which are arranged side by side and extend in a direction of an axis of a piston.

18. A fuel injection apparatus for an internal combustion engine having two inlet valves provided for each cylinder, the fuel injection apparatus comprising a fuel injection valve fitted to an inlet pipe on an upstream side of the two inlet valves, wherein the fuel injection valve is arranged to inject fuel in a form of a fuel spray towards each of the two inlet valves, wherein the injected fuel spray shows a flow distribution at a valve head of both the inlet valves, in which flow distribution a flow amount at each of locations on an exhaust system side and on an intake system side of respective centers of the respective valve heads is set to be local maximum values, and a line between two points, at which the flow amount indicates local maximum values, on the respective valve heads, is set to be displaced from the respective centers of the respective valve heads towards the respective adjacent inlet valve, and wherein at least a part of the fuel injected from the fuel injection valve impinges upon the respective valve heads of each inlet valve, and at least a part of a remainder of the injected fuel impinges onto opposed inside walls of the inlet pipe.

* * * * *